United States Patent
Aisenbrey (10) Patent No.: US 7,432,448 B2
(45) Date of Patent: Oct. 7, 2008

(54) LOW COST AIRCRAFT STRUCTURES AND AVIONICS MANUFACTURED FROM CONDUCTIVE LOADED RESIN-BASED MATERIALS

(75) Inventor: Thomas Aisenbrey, Littleton, CO (US)

(73) Assignee: Integral Technologies, Inc, Bellingham, WA (US)

( * ) Notice: Subject to any disclaimer, the term of this patent is extended or adjusted under 35 U.S.C. 154(b) by 301 days.

(21) Appl. No.: 11/125,989

(22) Filed: May 10, 2005

(65) Prior Publication Data

US 2006/0060690 A1    Mar. 23, 2006

Related U.S. Application Data (63) Continuation-in-part of application No. 10/877,092, filed on Jun. 25, 2004, which is a continuation of application No. 10/309,429, filed on Dec. 4, 2002, now Pat. No. 6,870,516, which is a continuation-in-part of application No. 10/075,778, filed on Feb. 14, 2002, now Pat. No. 6,741,221.

(60) Provisional application No. 60/317,808, filed on Sep. 7, 2001, provisional application No. 60/269,414, filed on Feb. 16, 2001, provisional application No. 60/268,822, filed on Feb. 15, 2001.

(51) Int. Cl.
*H01B 1/06* (2006.01)

(52) U.S. Cl. .............................. 174/126.2; 174/121 SR (58) Field of Classification Search ........... 174/121 SR, 174/126.1, 126.2, 133 R
See application file for complete search history.

(56) References Cited

U.S. PATENT DOCUMENTS

| 2,984,894 A | * | 5/1961 | Hill ........................... 428/554 |
| 4,561,613 A |   | 12/1985 | Weisend, Jr. ............ 244/134 A |
| 4,664,971 A | * | 5/1987 | Soens ........................ 428/372 |
| 4,710,594 A | * | 12/1987 | Walling et al. ........ 174/120 SR |
| 5,248,116 A |   | 9/1993 | Rauckhorst ............. 244/134 A |

(Continued)

FOREIGN PATENT DOCUMENTS

GB        377449 A    1/2003

OTHER PUBLICATIONS

Co-pending U.S. Appl. No. 11/126,032, filed May 10, 2005, "Low Cost Aircraft Structures and Avionics Manufactured From Conductive Loaded Resin-Based Materials", assigned to the same assignee.

*Primary Examiner*—Rob Swiatek
(74) *Attorney, Agent, or Firm*—Douglas Schnobel

(57) ABSTRACT

Aircraft structures and avionics are formed of a conductive loaded resin-based material. The conductive loaded resin-based material comprises micron conductive powder(s), conductive fiber(s), or a combination of conductive powder and conductive fibers in a base resin host. The percentage by weight of the conductive powder(s), conductive fiber(s), or a combination thereof is between about 20% and 50% of the weight of the conductive loaded resin-based material. The micron conductive powders are formed from non-metals, such as carbon, graphite, that may also be metallic plated, or the like, or from metals such as stainless steel, nickel, copper, silver, that may also be metallic plated, or the like, or from a combination of non-metal, plated, or in combination with, metal powders. The micron conductor fibers preferably are of nickel plated carbon fiber, stainless steel fiber, copper fiber, silver fiber, aluminum fiber, or the like.

3 Claims, 8 Drawing Sheets

U.S. PATENT DOCUMENTS

| | | | |
|---|---|---|---|
| 5,496,002 A | 3/1996 | Schutze | 244/123 |
| 5,733,390 A | 3/1998 | Kingston | 148/537 |
| 5,735,486 A | 4/1998 | Piening et al. | 244/124 |
| 5,843,567 A * | 12/1998 | Swift et al. | 428/221 |
| 5,925,275 A | 7/1999 | Lawson et al. | 219/543 |
| 6,372,072 B1 | 4/2002 | Healey | 156/148 |

* cited by examiner

LOW COST AIRCRAFT STRUCTURES AND AVIONICS MANUFACTURED FROM CONDUCTIVE LOADED RESIN-BASED MATERIALS

RELATED PATENT APPLICATIONS

This patent application is related to U.S. patent application Ser. No. 11/126,032, and filed on May 10, 2005, which is herein incorporated by reference in its entirety.

This patent application claims priority to the U.S. Provisional Patent Application 60/570,517, filed on May 12, 2004, which is herein incorporated by reference in its entirety.

This patent application is a Continuation-in-Part of U.S. patent application Ser. No. 10/877,092, filed on Jun. 25, 2004, which is a Continuation of U.S. patent application Ser. No. 10/309,429, filed on Dec. 4, 2002, now issued as U.S. Pat. No. 6,870,516, also incorporated by reference in its entirety, which is a Continuation-in-Part application of U.S. patent application Ser. No. 10/075,778, filed on Feb. 14, 2002, now issued as U.S. Pat. No. 6,741,221, which claimed priority to U.S. Provisional Patent Applications Ser. No. 60/317,808, filed on Sep. 7, 2001, Ser. No. 60/269,414, filed on Feb. 16, 2001, and Ser. No. 60/268,822, filed on Feb. 15, 2001, all of which are incorporated by reference in their entirety.

BACKGROUND OF THE INVENTION (1) Field of the Invention

This invention relates to aircraft structures and avionics and, more particularly, to aircraft structures and avionics molded of conductive loaded resin-based materials comprising micron conductive powders, micron conductive fibers, or a combination thereof, substantially homogenized within a base resin when molded. This manufacturing process yields a conductive part or material usable within the EMF or electronic spectrum(s).

(2) Description of the Prior Art

Aviation material applications are very demanding. Typically, aviation structures and components must be constructed of materials that have a high strength to weight ratio since the demands of flight place a premium on weight. Aluminum has long been used in the manufacture of aircraft structures and components to achieve high strength to weight. Another consideration for material applications in aviation is in aviation electrical and electronics, or avionics. Materials combining excellent thermal and electrical conductivity with low weight are very useful. Another consideration for aviation materials is electromagnetic performance. Particularly in modern military applications, achievement of minimal radar footprint is a significant goal. Therefore, materials that optimally absorb the electromagnetic energy of a radar system are very useful for military aviation applications. It is an important object of the present invention to create and to apply new materials for aviation structures, components, and avionics devices having significant advantages over existing materials.

Several prior art inventions relate to aircraft structures and avionics. U.S. Pat. No. 5,925,275 to Lawson et al teaches an electrically conductive composite heating assembly that has as its foundation an electrically conductive non-woven fiber layer laminated between layers of fiberglass and other dielectric material and has an abrasion resistant outer layer. An example of electrically conductive non-woven fabric including nickel-coated carbon fibers is described. This invention also teaches the ability to add additional electrical shielding layers to provide ground fault protection. U.S. Pat. No. 6,372,072 B1 to Healey teaches a composite laminate comprising a series of fabric plies of fibrous reinforcing material set in plastics matrix material for use in aircraft wing construction. U.S. Pat. No. 5,735,486 to Piening et al teaches the manufacture of aircraft wings with wing shells with good shear strength made of fibrous composite materials, particularly fiber-reinforced plastics. The invention teaches the use of carbon fiber reinforced plastics.

U.S. Pat. No. 5,496,002 to Schutze teaches an aircraft wing made of composite fiber materials, especially carbon fiber reinforced plastics, with shell components having a thin-walled, pre-formed wing skin and tubular rods as stringers. The tubular rods used for stringers are also manufactured from carbon fiber reinforced plastic. U.S. Pat. No. 5,248,116 to Rauckhorst teaches an aircraft wing surface de-icing method utilizing inflatable tubular members comprising a non-metallic high tensile modulus fiber-reinforced matrix structural backing and a thin high tensile modulus outer skin. This invention teaches the use of metal or plastic for the outer skin. U.S. Pat. No. 4,561,613 to Weisend teaches the use of an inflatable de-icer and the method of application to the aircraft wing. This invention utilizes composite layers of air impervious material being covered with a resilient rubber air impervious material. U.S. Pat. No. 5,733,390 to Kingston teaches a carbon-titanium composite, laminate material, method of manufacture, and application to aircraft structures.

SUMMARY OF THE INVENTION

A principal object of the present invention is to provide an effective aircraft device.

A further object of the present invention is to provide a method to form an aircraft device.

A further object of the present invention is to provide an aircraft components and avionics molded of conductive loaded resin-based materials.

A yet further object of the present invention is to provide avionics components having reduced weight.

A yet further object of the present invention is to provide avionics components having improved performance.

A yet further object of the present invention is to provide aircraft components having reduced weight.

A yet further object of the present invention is to provide aircraft components having improved electromagnetic performance.

A yet further object of the present invention is to provide aircraft components having improved conductivity.

A yet further object of the present invention is to provide a aircraft component molded of conductive loaded resin-based material where the electrical, thermal, and electromagnetic characteristics can be altered or the visual characteristics can be altered by forming a metal layer over the conductive loaded resin-based material.

A yet further object of the present invention is to provide a method to fabricate an aircraft component from a conductive loaded resin-based material where the material is in the form of a fabric.

In accordance with the objects of this invention, an aircraft device is achieved. The device comprises conductive loaded, resin-based material comprising conductive materials in a base resin host. The percent by weight of the conductive materials is between 20% and 50% of the total weight of the conductive loaded resin-based material.

Also in accordance with the objects of this invention, an avionics device is achieved. The device comprises conductive loaded, resin-based material comprising conductive materials in a base resin host. The percent by weight of the conductive materials is between 20% and 50% of the total weight of the conductive loaded resin-based material.

Also in accordance with the objects of this invention, an aircraft device is achieved. The device comprises a fuselage and wings. The fuselage and wings comprise a conductive loaded, resin-based material comprising micron conductive fiber in a base resin host. The percent by weight of the micron conductive fiber is between 20% and 50% of the total weight of the conductive loaded resin-based material.

Also in accordance with the objects of this invention, a method to form an aircraft component device is achieved. The method comprises providing a conductive loaded, resin-based material comprising conductive materials in a resin-based host. The percent by weight of the conductive materials is between 20% and 50% of the total weight of the conductive loaded resin-based material. The conductive loaded, resin-based material is molded into an aircraft component device.

Also in accordance with the objects of this invention, a method to form an avionics device is achieved. The method comprises providing a conductive loaded, resin-based material comprising conductive materials in a resin-based host. The percent by weight of the conductive materials is between 20% and 50% of the total weight of the conductive loaded resin-based material. The conductive loaded, resin-based material is molded into an avionics device.

Also in accordance with the objects of this invention, a method to form an aircraft component device is achieved. The method comprises providing a conductive loaded, resin-based material comprising micron conductive fiber in a resin-based host. The percent by weight of the micron conductive fiber is between 20% and 50% of the total weight of the conductive loaded resin-based material. The conductive loaded, resin-based material is molded into an aircraft component device.

BRIEF DESCRIPTION OF THE DRAWINGS

In the accompanying drawings forming a material part of this description, there is shown.

DESCRIPTION OF THE PREFERRED EMBODIMENTS

This invention relates to aircraft structures and avionics molded of conductive loaded resin-based materials comprising micron conductive powders, micron conductive fibers, or a combination thereof, substantially homogenized within a base resin when molded.

The conductive loaded resin-based materials of the invention are base resins loaded with conductive materials, which then makes any base resin a conductor rather than an insulator. The resins provide the structural integrity to the molded part. The micron conductive fibers, micron conductive powders, or a combination thereof, are substantially homogenized within the resin during the molding process, providing the electrical continuity.

The conductive loaded resin-based materials can be molded, extruded or the like to provide almost any desired shape or size. The molded conductive loaded resin-based materials can also be cut, stamped, or vacuumed formed from an injection molded or extruded sheet or bar stock, overmolded, laminated, milled or the like to provide the desired shape and size. The thermal or electrical conductivity characteristics of aircraft structures and avionics fabricated using conductive loaded resin-based materials depend on the composition of the conductive loaded resin-based materials, of which the loading or doping parameters can be adjusted, to aid in achieving the desired structural, electrical or other physical characteristics of the material. The selected materials used to fabricate the aircraft structures and avionics devices are substantially homogenized together using molding techniques and or methods such as injection molding, over-molding, insert molding, thermo-set, protrusion, extrusion or the like. Characteristics related to 2D, 3D, 4D, and 5D designs, molding and electrical characteristics, include the physical and electrical advantages that can be achieved during the molding process of the actual parts and the polymer physics associated within the conductive networks within the molded part(s) or formed material(s).

In the conductive loaded resin-based material, electrons travel from point to point when under stress, following the path of least resistance. Most resin-based materials are insulators and represent a high resistance to electron passage. The doping of the conductive loading into the resin-based material alters the inherent resistance of the polymers. At a threshold concentration of conductive loading, the resistance through the combined mass is lowered enough to allow electron movement. Speed of electron movement depends on conductive loading concentration, that is, the separation between the conductive loading particles. Increasing conductive loading content reduces interparticle separation distance, and, at a critical distance known as the percolation point, resistance decreases dramatically and electrons move rapidly.

Resistivity is a material property that depends on the atomic bonding and on the microstructure of the material. The atomic microstructure material properties within the conductive loaded resin-based material are altered when molded into a structure. A substantially homogenized conductive microstructure of delocalized valance electrons is created. This microstructure provides sufficient charge carriers within the molded matrix structure. As a result, a low density, low resistivity, lightweight, durable, resin based polymer microstructure material is achieved. This material exhibits conductivity comparable to that of highly conductive metals such as silver, copper or aluminum, while maintaining the superior structural characteristics found in many plastics and rubbers or other structural resin based materials.

The use of conductive loaded resin-based materials in the fabrication of aircraft structures and avionics significantly lowers the cost of materials and the design and manufacturing processes used to hold ease of close tolerances, by forming these materials into desired shapes and sizes. The aircraft structures and avionics can be manufactured into infinite shapes and sizes using conventional forming methods such as injection molding, over-molding, or extrusion or the like. The conductive loaded resin-based materials, when molded, typically but not exclusively produce a desirable usable range of resistivity from between about 5 and 25 ohms per square, but other resistivities can be achieved by varying the doping parameters and/or resin selection(s).

The conductive loaded resin-based materials comprise micron conductive powders, micron conductive fibers, or any combination thereof, which are substantially homogenized together within the base resin, during the molding process, yielding an easy to produce low cost, electrically conductive, close tolerance manufactured part or circuit. The resulting molded article comprises a three dimensional, continuous network of conductive loading and polymer matrix. The micron conductive powders can be of carbons, graphites, amines or the like, and/or of metal powders such as nickel, copper, silver, aluminum, or plated or the like. The use of carbons or other forms of powders such as graphite(s) etc. can create additional low level electron exchange and, when used in combination with micron conductive fibers, creates a micron filler element within the micron conductive network of fiber(s) producing further electrical conductivity as well as acting as a lubricant for the molding equipment. The micron conductive fibers may be metal fiber or metal plated fiber. Further, the metal plated fiber may be formed by metal plating onto a metal fiber or metal plating onto a non-metal fiber. Exemplary micron conductive fibers include nickel plated carbon fiber, stainless steel fiber, copper fiber, silver fiber, aluminum fiber, or the like, or combinations thereof. Metal plating for fiber include copper, nickel, cobalt, silver, gold, palladium, platinum, ruthenium, and rhodium, and alloys of thereof. Non-metal fiber cores include carbon, graphite, polyester, and other synthetic materials. Superconductor metals, such as titanium, nickel, niobium, and zirconium, and alloys of titanium, nickel, niobium, and zirconium may also be used as micron conductive fibers in the present invention. The structural material is a material such as any polymer resin. Structural material can be, here given as examples and not as an exhaustive list, polymer resins produced by GE PLASTICS, Pittsfield, Mass., a range of other plastics produced by GE PLASTICS, Pittsfield, Mass., a range of other plastics produced by other manufacturers, silicones produced by GE SILICONES, Waterford, N.Y., or other flexible resin-based rubber compounds produced by other manufacturers.

The resin-based structural material loaded with micron conductive powders, micron conductive fibers, or in combination thereof can be molded, using conventional molding methods such as injection molding or over-molding, or extrusion to create desired shapes and sizes. The molded conductive loaded resin-based materials can also be stamped, cut or milled as desired to form create the desired shape form factor(s) of the aircraft structures and avionics. The doping composition and directionality associated with the micron conductors within the loaded base resins can affect the electrical and structural characteristics of the aircraft structures and avionics and can be precisely controlled by mold designs, gating and or protrusion design(s) and or during the molding process itself. In addition, the resin base can be selected to obtain the desired thermal characteristics such as very high melting point or specific thermal conductivity.

A resin-based sandwich laminate could also be fabricated with random or continuous webbed micron stainless steel fibers or other conductive fibers, forming a cloth like material. The webbed conductive fiber can be laminated or the like to materials such as Teflon, Polyesters, or any resin-based flexible or solid material(s), which when discretely designed in fiber content(s), orientation(s) and shape(s), will produce a very highly conductive flexible cloth-like material. Such a cloth-like material could also be used in forming aircraft structures and avionics that could be embedded into fabric as well as other resin materials such as rubber(s) or plastic(s). When using conductive fibers as a webbed conductor as part of a laminate or cloth-like material, the fibers may have diameters of between about 3 and 12 microns, typically between about 8 and 12 microns or in the range of about 10 microns, with length(s) that can be seamless or overlapping.

The conductive loaded resin-based material of the present invention can be made resistant to corrosion and/or metal electrolysis by selecting micron conductive fiber and/or micron conductive powder and base resin that are resistant to corrosion and/or metal electrolysis. For example, if a corrosion/electrolysis resistant base resin is combined with stainless steel fiber and carbon fiber/powder, then a corrosion and/or metal electrolysis resistant conductive loaded resin-based material is achieved. Another additional and important feature of the present invention is that the conductive loaded resin-based material of the present invention may be made flame retardant. Selection of a flame-retardant (FR) base resin material allows the resulting product to exhibit flame retardant capability. This is especially important in aircraft structures and avionics applications as described herein.

The substantially homogeneous mixing of micron conductive fiber and/or micron conductive powder and base resin described in the present invention may also be described as doping. That is, the substantially homogeneous mixing converts the typically non-conductive base resin material into a conductive material. This process is analogous to the doping process whereby a semiconductor material, such as silicon, can be converted into a conductive material through the introduction of donor/acceptor ions as is well known in the art of semiconductor devices. Therefore, the present invention uses the term doping to mean converting a typically non-conductive base resin material into a conductive material through the substantially homogeneous mixing of micron conductive fiber and/or micron conductive powder into a base resin.

As an additional and important feature of the present invention, the molded conductor loaded resin-based material exhibits excellent thermal dissipation characteristics. Therefore, aircraft structures and avionics manufactured from the molded conductor loaded resin-based material can provide added thermal dissipation capabilities to the application. For example, heat can be dissipated from electrical devices physically and/or electrically connected to aircraft structures and avionics of the present invention.

As a significant advantage of the present invention, aircraft structures and avionics constructed of the conductive loaded resin-based material can be easily interfaced to an electrical circuit or grounded. In one embodiment, a wire can be attached to a conductive loaded resin-based aircraft structures and avionics via a screw that is fastened to the structure or device. For example, a simple sheet-metal type, self tapping screw, when fastened to the material, can achieve excellent electrical connectivity via the conductive matrix of the conductive loaded resin-based material. To facilitate this approach a boss may be molded into the conductive loaded resin-based material to accommodate such a screw. Alternatively, if a solderable screw material, such as copper, is used, then a wire can be soldered to the screw that is embedded into the conductive loaded resin-based material. In another embodiment, the conductive loaded resin-based material is partly or completely plated with a metal layer. The metal layer forms excellent electrical conductivity with the conductive matrix. A connection of this metal layer to another circuit or to ground is then made. For example, if the metal layer is solderable, then a soldered connection may be made between the structure or device and a grounding wire.

Where a metal layer is formed over the surface of the conductive loaded resin-based material, any of several techniques may be used to form this metal layer. This metal layer may be used for visual enhancement of the molded conductive loaded resin-based material article or to otherwise alter performance properties. Well-known techniques, such as electroless metal plating, electro metal plating, metal vapor deposition, metallic painting, or the like, may be applied to the formation of this metal layer. If metal plating is used, then the resin-based structural material of the conductive loaded, resin-based material is one that can be metal plated. There are many of the polymer resins that can be plated with metal layers. For example, GE Plastics, SUPEC, VALOX, ULTEM, CYCOLAC, UGIKRAL, STYRON, CYCOLOY are a few resin-based materials that can be metal plated. Electroless plating is typically a multiple-stage chemical process where, for example, a thin copper layer is first deposited to form a conductive layer. This conductive layer is then used as an electrode for the subsequent plating of a thicker metal layer.

A typical metal deposition process for forming a metal layer onto the conductive loaded resin-based material is vacuum metallization. Vacuum metallization is the process where a metal layer, such as aluminum, is deposited on the conductive loaded resin-based material inside a vacuum chamber. In a metallic painting process, metal particles, such as silver, copper, or nickel, or the like, are dispersed in an acrylic, vinyl, epoxy, or urethane binder. Most resin-based materials accept and hold paint well, and automatic spraying systems apply coating with consistency. In addition, the excellent conductivity of the conductive loaded resin-based material of the present invention facilitates the use of extremely efficient, electrostatic painting techniques.

The conductive loaded resin-based material can be contacted in any of several ways. In one embodiment, a pin is embedded into the conductive loaded resin-based material by insert molding, ultrasonic welding, pressing, or other means. A connection with a metal wire can easily be made to this pin and results in excellent contact to the conductive loaded resin-based material. In another embodiment, a hole is formed in to the conductive loaded resin-based material either during the molding process or by a subsequent process step such as drilling, punching, or the like. A pin is then placed into the hole and is then ultrasonically welded to form a permanent mechanical and electrical contact. In yet another embodiment, a pin or a wire is soldered to the conductive loaded resin-based material. In this case, a hole is formed in the conductive loaded resin-based material either during the molding operation or by drilling, stamping, punching, or the like. A solderable layer is then formed in the hole. The solderable layer is preferably formed by metal plating. A conductor is placed into the hole and then mechanically and electrically bonded by point, wave, or reflow soldering.

Another method to provide connectivity to the conductive loaded resin-based material is through the application of a solderable ink film to the surface. One exemplary solderable ink is a combination of copper and solder particles in an epoxy resin binder. The resulting mixture is an active, screen-printable and dispensable material. During curing, the solder reflows to coat and to connect the copper particles and to thereby form a cured surface that is directly solderable without the need for additional plating or other processing steps. Any solderable material may then be mechanically and/or electrically attached, via soldering, to the conductive loaded resin-based material at the location of the applied solderable ink. Many other types of solderable inks can be used to provide this solderable surface onto the conductive loaded resin-based material of the present invention. Another exemplary embodiment of a solderable ink is a mixture of one or more metal powder systems with a reactive organic medium. This type of ink material is converted to solderable pure metal during a low temperature cure without any organic binders or alloying elements.

A ferromagnetic conductive loaded resin-based material may be formed of the present invention to create a magnetic or magnetizable form of the material. Ferromagnetic micron conductive fibers and/or ferromagnetic conductive powders are mixed with the base resin. Ferrite materials and/or rare earth magnetic materials are added as a conductive loading to the base resin. With the substantially homogeneous mixing of the ferromagnetic micron conductive fibers and/or micron conductive powders, the ferromagnetic conductive loaded resin-based material is able to produce an excellent low cost, low weight magnetize-able item. The magnets and magnetic devices of the present invention can be magnetized during or after the molding process. The magnetic strength of the magnets and magnetic devices can be varied by adjusting the amount of ferromagnetic micron conductive fibers and/or ferromagnetic micron conductive powders that are incorporated with the base resin. By increasing the amount of the ferromagnetic doping, the strength of the magnet or magnetic devices is increased. The substantially homogenous mixing of the conductive fiber network allows for a substantial amount of fiber to be added to the base resin without causing the structural integrity of the item to decline. The ferromagnetic conductive loaded resin-based magnets display the excellent physical properties of the base resin, including flexibility, moldability, strength, and resistance to environmental corrosion, along with excellent magnetic ability. In addition, the unique ferromagnetic conductive loaded resin-based material facilitates formation of items that exhibit excellent thermal and electrical conductivity as well as magnetism.

A high aspect ratio magnet is easily achieved through the use of ferromagnetic conductive micron fiber or through the combination of ferromagnetic micron powder with conductive micron fiber. The use of micron conductive fiber allows for molding articles with a high aspect ratio of conductive fiber to cross sectional area. If a ferromagnetic micron fiber is used, then this high aspect ratio translates into a high quality magnetic article. Alternatively, if a ferromagnetic micron powder is combined with micron conductive fiber, then the magnetic effect of the powder is effectively spread throughout the molded article via the network of conductive fiber such that an effective high aspect ratio molded magnetic article is achieved. The ferromagnetic conductive loaded resin-based material may be magnetized, after molding, by exposing the molded article to a strong magnetic field. Alternatively, a strong magnetic field may be used to magnetize the ferromagnetic conductive loaded resin-based material during the molding process.

Exemplary ferromagnetic conductive fiber materials include ferrite, or ceramic, materials as nickel zinc, manganese zinc, and combinations of iron, boron, and strontium, and the like. In addition, rare earth elements, such as neodymium and samarium, typified by neodymium-iron-boron, samarium-cobalt, and the like, are useful ferromagnetic conductive fiber materials. Exemplary non-ferromagnetic conductor fibers include stainless steel, nickel, copper, silver, aluminum, or other suitable metals or conductive fibers, alloys, plated materials, or combinations thereof. Superconductor metals, such as titanium, nickel, niobium, and zirconium, and alloys of titanium, nickel, niobium, and zirconium may also be used as micron conductive fibers in the present invention. Exemplary ferromagnetic micron powder leached onto the conductive fibers include ferrite, or ceramic, materials as nickel zinc, manganese zinc, and combinations of iron, boron, and strontium, and the like. In addition, rare earth elements, such as neodymium and samarium, typified by neodymium-iron-boron, samarium-cobalt, and the like, are useful ferromagnetic conductive powder materials.

Figure 1:
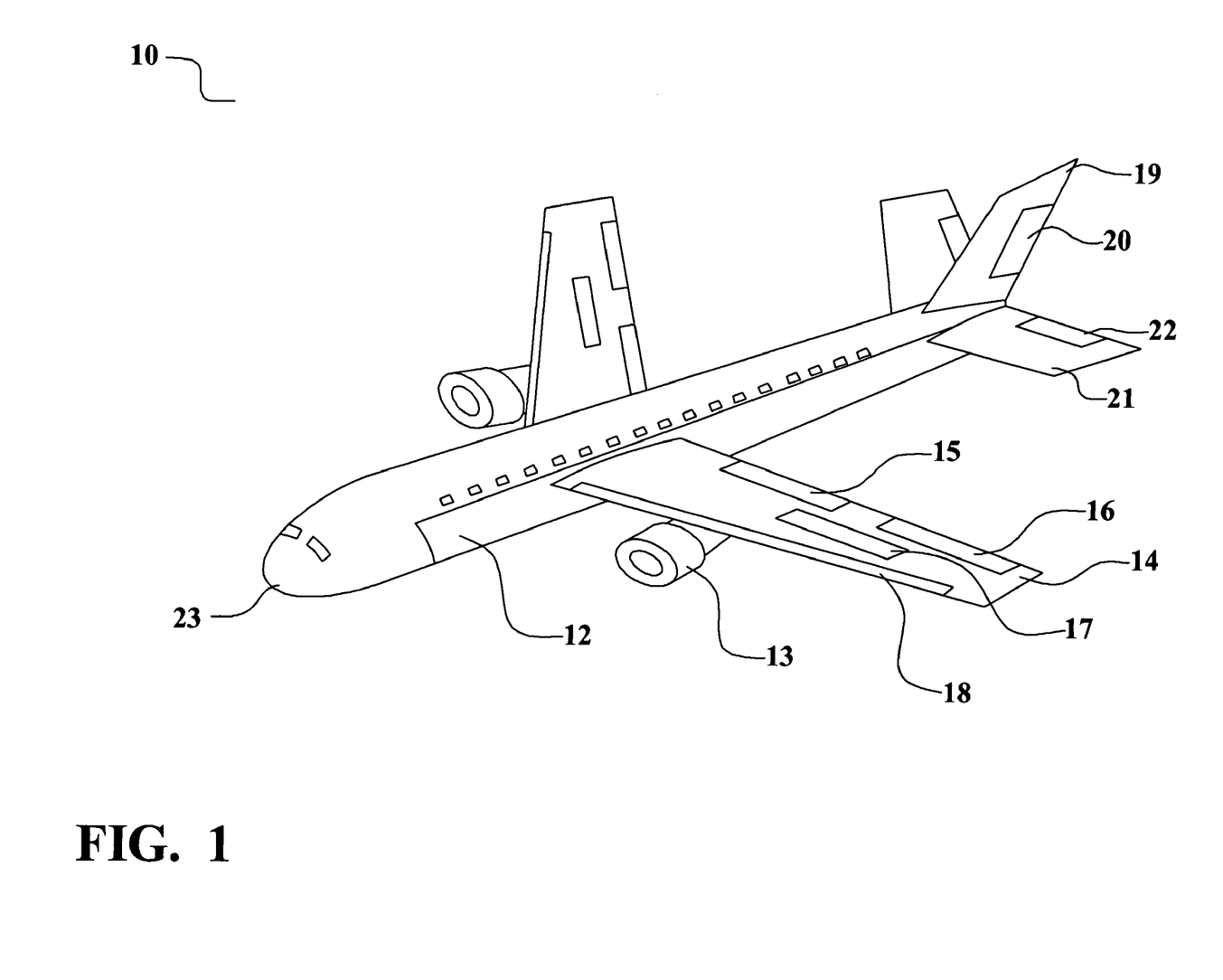
FIG. 1 illustrates a first preferred embodiment of the present invention showing an aircraft having components comprising a conductive loaded resin-based material.

Referring now to FIG. 1, a first preferred embodiment of the present invention is illustrated. In particular, an aircraft 10 is shown. As an important feature, the aircraft 10 has at least one structural component comprising, at least in part, the conductive loaded resin-based material of the present invention. A representative, though not exhaustive, list of structural components of an aircraft that may be formed using the conductive loaded resin-based material includes the fuselage 12, or body, the wings 14, the engine 13, the flaps 15, the ailerons 16, the spoilers 17, the slats 18, the vertical stabilizer 19, the rudder 20, the horizontal stabilizer 21, the elevator 22, and/or the cockpit 23. The conductive loaded resin-based material of the present invention provides a high strength to weight ratio, excellent thermal and electrical conductivity, excellent resistance to moisture and corrosion, and economic manufacture when compared to typical aircraft systems based upon aluminum. The above described structural components include the inner airframe, or structure, as well as the outer skin. While a jet airliner is depicted, the present invention may equally be applied to propeller driven aircraft, to large or small aircraft, and to personal as well as to commercial aircraft.

Certain structures, components, or avionics in aircraft require high temperature capability or large thermal conductivity. Oil coolers, or other components associated with the engine 13, may be exposed to prolonged high temperature operation and/or may require the ability to transfer heat. In particular, an oil cooler must remove heat from the engine lubricating oil. Therefore, another preferred embodiment of the present invention is to construct an oil cooler from the conductive loaded resin-based material of the present invention. This oil cooler optimally combines the capability of high temperature operation and of excellent thermal conductivity. As a significant advantage over the prior art, however, the oil cooler of the present invention weighs far less than an oil cooler constructed of typical materials, such as aluminum or another metal or alloy.

Another preferred embodiment of the present invention is to construct aircraft engine cowlings from the conductive loaded resin-based material. The engine cowling is typically a thin sheet of metal, such as aluminum, that surrounds the engine 13 to protect the engine 13 from environmental contamination and/or physical damage. Although the cowling is purposely constructed as a thin layer, the relatively large size of the engine, as well as the use of multiple engines, can lead to a large cumulative amount of cowling material, and weight, on the aircraft. In the present invention, the cowling is constructed of the conductive loaded resin-based material. This conductive loaded resin-based material is typically much lighter, per volume, than the metal it replaces. As a result, the cowling constructed of the conductive loaded resin-based material is significantly lighter and, therefore, results in a savings of hundreds of pounds in gross aircraft weight when compared to the prior art.

Another preferred embodiment of the present invention is to construct non-engine, mechanical systems from the conductive loaded resin-based material. Of particular importance, the hydraulic system used for controlling the flight control surfaces, such as flaps 15, ailerons 16, spoilers 17, slats 18, rudder 20, and elevator 22, is so constructed according to an embodiment of the present invention. In particular, the cases and/or other structural and/or electrical components of the hydraulic motors of the flight control system are constructed of the conductive loaded resin-based material. The several capabilities of this material, including excellent strength, thermal and electrical conductivity, and the like, allow this material to replace prior art materials, such as metals and metal alloys, while providing excellent performance and while reducing weight.

Figure 7:
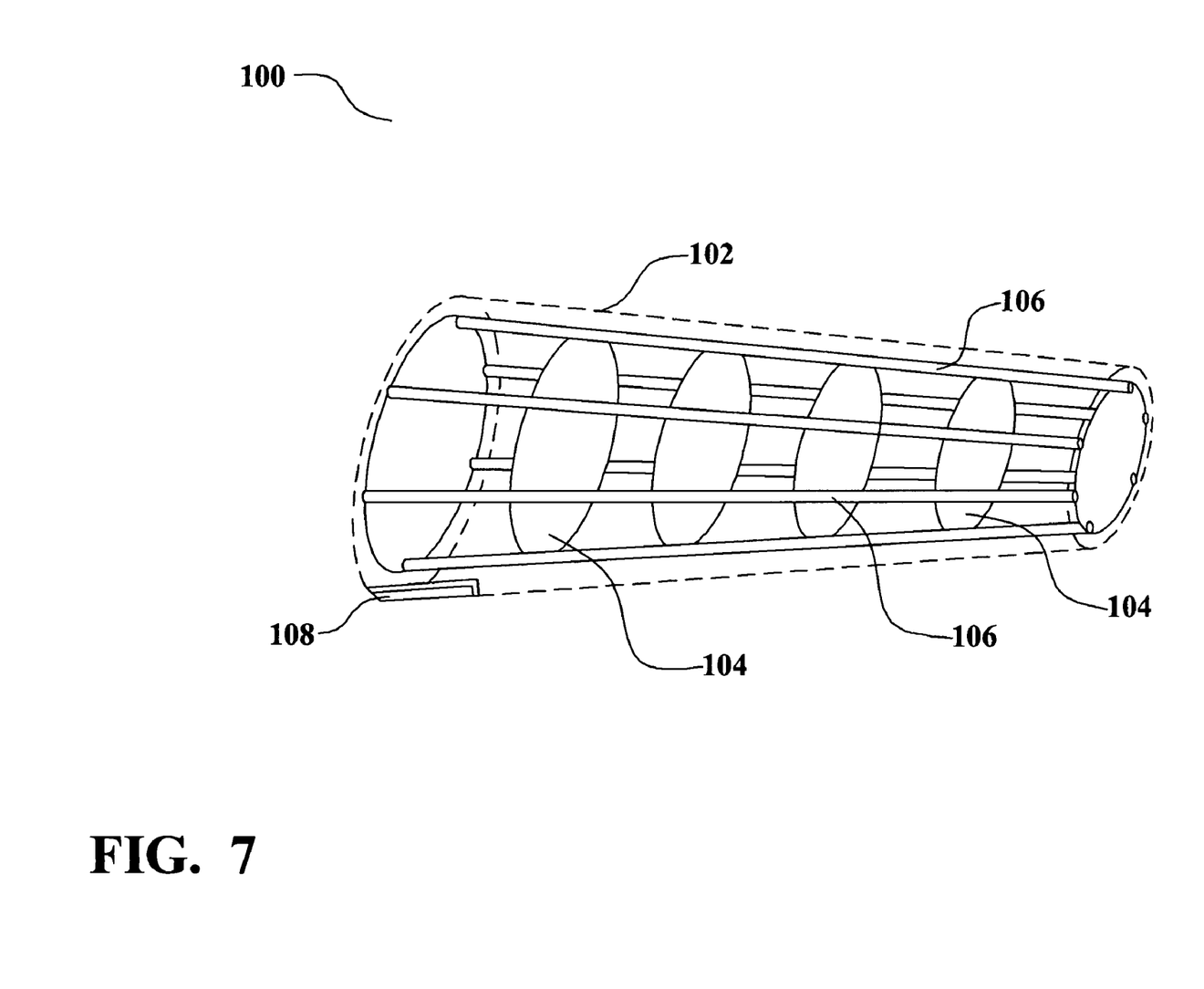
FIG. 7 illustrates a second preferred embodiment of the present invention showing an aircraft wing having structural components, including wing spars, ribs, stringers, and/or skin comprising the conductive loaded resin-based material according to the present invention.

Referring now to FIG. 7, if a second preferred embodiment of the present invention is illustrated. In this embodiment, an aircraft wing structure 102 is shown in partial cutaway form. In particular, wing structural components such as the wing spar box or, more particularly, wing spars 104, and stringers 106 are shown. Wing spars 104 define the cross-sectional shape of the wing airfoil. Stringers 106 provide lateral shape and strength to the wing. The wing spars 104 and stringers 106 form a skeleton structure onto which the outer skin 108 of the aircraft wing 102 is attached. In the present invention, the wing spars 104, the stringers 106, and/or the skin 108 comprise, at least in part, the conductive loaded resin-based material of the present invention. For example, the stringers 106 or the skin 108 may be formed by extrusion, and the wing spars 104 may be formed by injection molding. The conductive loaded resin-based material of the present invention provides a high strength to weight ratio and excellent thermal and electrical conductivity, and economic manufacture when compared to typical aircraft structural materials, such as aluminum. The excellent thermal and electrical conductivity of the conductive loaded resin-based material provides additional or improved electrostatic discharge (ESD) protection capability when compared to, for example, polymer or composite based materials that are not conductive.

Figure 8:
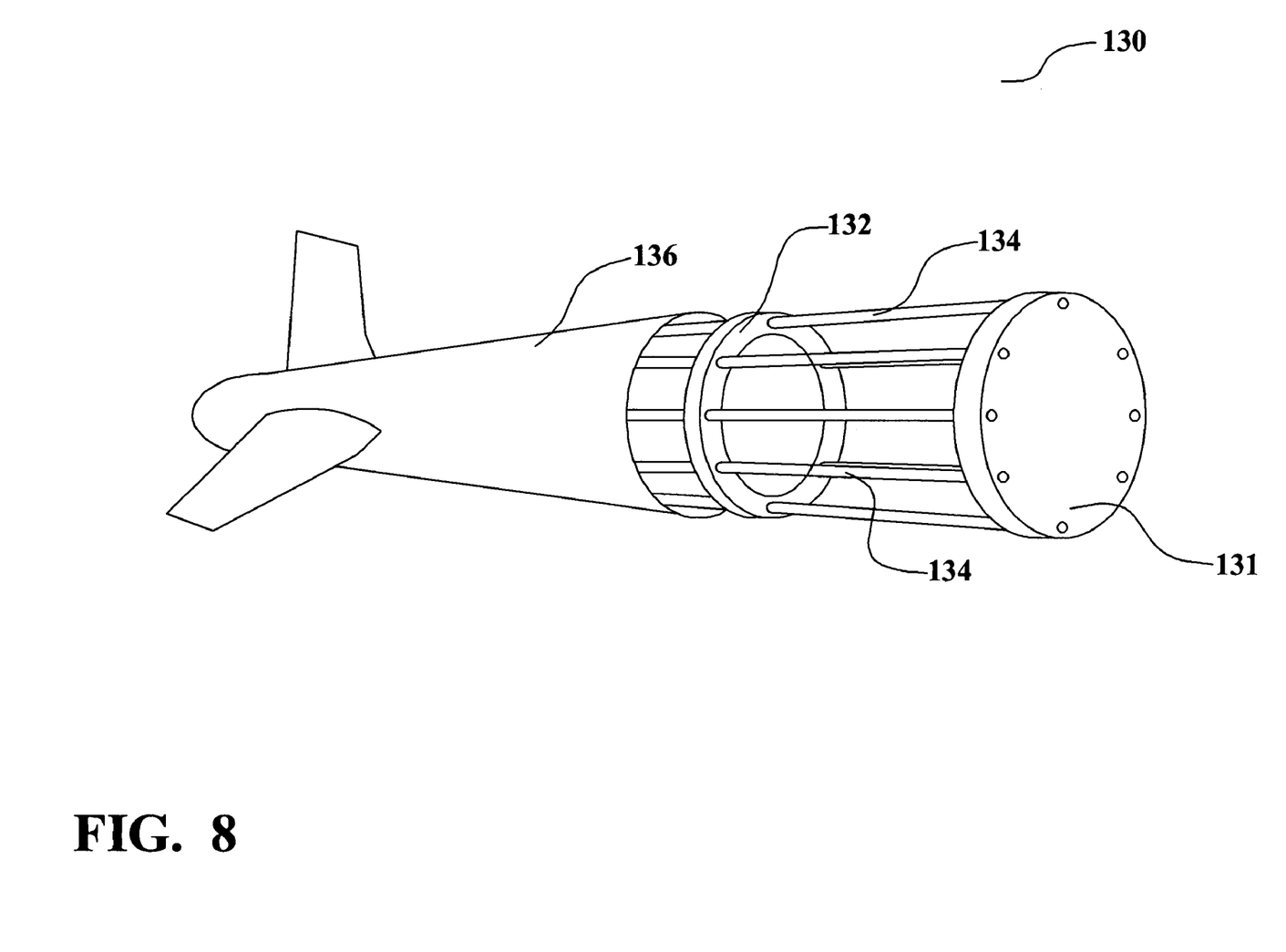
FIG. 8 illustrates a third preferred embodiment of the present invention showing an aircraft fuselage having structural components, including bulkhead, formers, stringers, and/or skin comprising the conductive loaded resin-based material according to the present invention.

Referring now to FIG. 8, a third preferred embodiment of the present invention is illustrated. An aircraft fuselage 130 is shown in partial cutaway form. The fuselage 130 comprises, in part, a bulk head 131, formers 132, stringers 134, and the fuselage skin 136. As in the case of the wing, the fuselage structure again comprises an internal skeleton comprising the formers 132 and the bulk head 131 that establish the cross-sectional shape of the fuselage 130. The stringers 134 provide longitudinal shape and strength. In the present embodiment, any, or all, of the above described structural components comprise the conductive loaded resin-based material of the present invention.

Figure 9A:
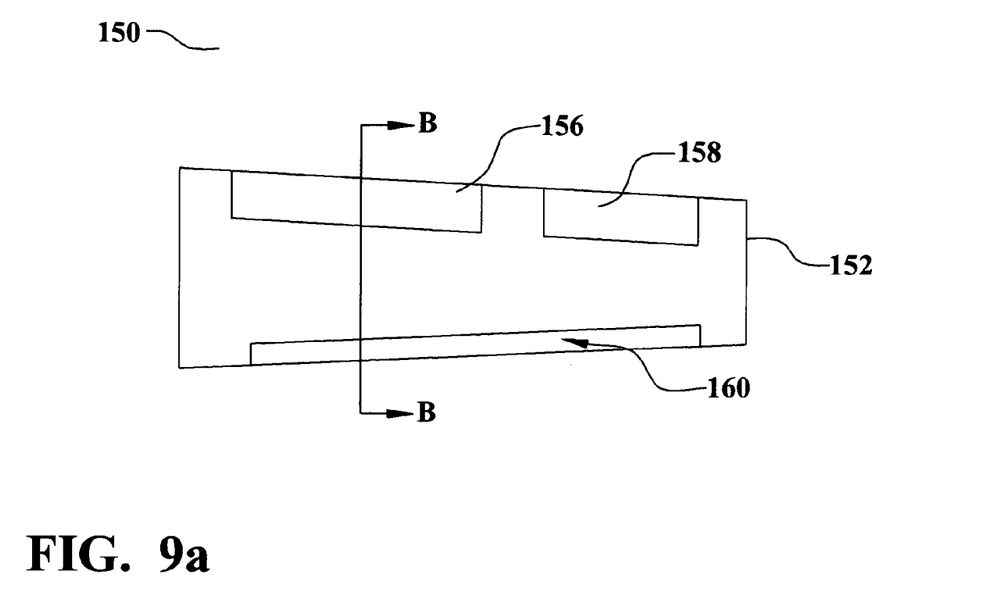
FIGS. 9a and 9b illustrate a fourth preferred embodiment of the present invention showing an aircraft wing having a deicing boot comprising the conductive loaded resin-based material of the present invention.
Figure 9B:
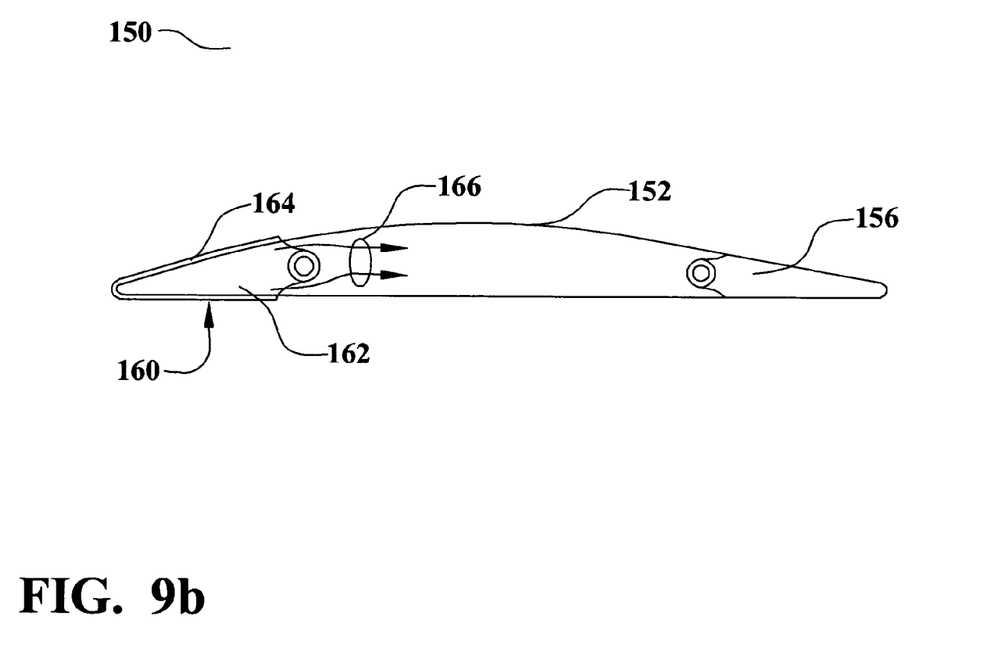

Referring now to FIGS. 9a and 9b, a fourth preferred embodiment of the present invention is illustrated. An aircraft wing 150 is illustrated. The wing 150 comprises the slats 160, the flaps 156, and the aileron 158 as described earlier. In addition, as is illustrated particularly in the cross-section of FIG. 9b, a deicing structure 164 is formed on the slats 162 on the leading edge of the wing 150. In particular, the deicing structure 164 comprises a boot, or covering, of the conductive loaded resin-based material formed over the slats 162. The conductive loaded resin-based material acts as a heating device, or deicing boot 164. In operation, electrical power is conducted through terminals 166 connected to the deicing boot 164. Heating of the deicing boot 164 is sufficient to melt any ice buildup on the leading edge of the wing 150.

Figure 10:
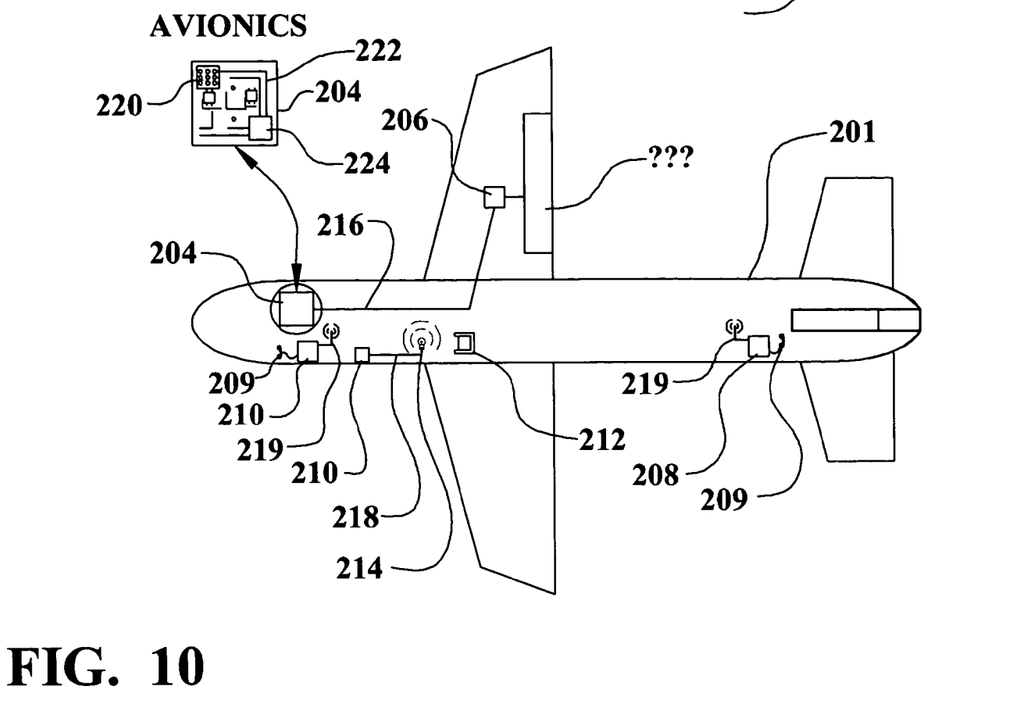
FIG. 10 illustrates a fifth preferred embodiment showing an aircraft having avionics components, wiring systems, and communication systems comprising the conductive loaded resin-based material of the present invention.

Referring now to FIG. 10, a fifth preferred embodiment of the present invention is illustrated. In this embodiment 200, an aircraft 201 is shown with a number of exemplary avionics components, systems, and/or wiring systems comprising the conductive loaded resin-based material of the present invention. For example, the flight control system 204 may comprise board or system level components formed of the conductive loaded resin-based material. Circuit board traces 222, or other conductors, heat sinks 220, or other heat dissipation devices, and electromagnetic interference (EMI) shields 224, or cans, are examples of board-level avionics components that are fabricated of the conductive loaded resin-based material according to the present invention. The flight control system 204 is further connected to local control actuator systems 206 to control flight control surfaces, such as flaps 209. The connective wiring 216 between the flight control system 204 and the local control 206 comprises the conductive loaded resin-based material according to the present invention.

Further, according to one embodiment of the present invention, entire wiring harnesses 216 are constructed with "wires" of the conductive loaded resin-based material. Such wiring harnesses 216 may be formed as continuous cables, of any shape or length, of conductive loaded resin-based lines surrounded by an insulating material. By constructing the wiring harnesses of the conductive loaded resin-based material, the weight of the wiring harness is substantially reduced when compared to traditional copper-based wiring harnesses.

The teachings of the present invention may be extended to other, non-flight control systems. For example, in-flight communication systems 208 comprise the conductive loaded resin-based material as described above. Further, wireless communication systems 208 comprise transmitting/receiving antennas 219 formed of the conductive loaded resin-based material. In addition, passenger 212 comfort and entertainment systems 214 use the conductive loaded resin-based material report internal system components 210 as described above and for system-to-system conductivity 218.

In the above described avionics applications, the conductive loaded resin-based material provides electrical conductivity, electromagnetic interference absorption and shielding, and RF transceiving capability. Of particular importance to aircraft applications, the conductive loaded resin-based material of the present invention replaces traditional materials, such as aluminum and/or copper, while providing a significant reduction in weight. One example of a conductive loaded resin-based material weighs only about 40% as much as aluminum. Further, the conductive loaded resin-based material can be made as strong as, or stronger than, aluminum depending upon the type of base resin selected.

Figure 11:
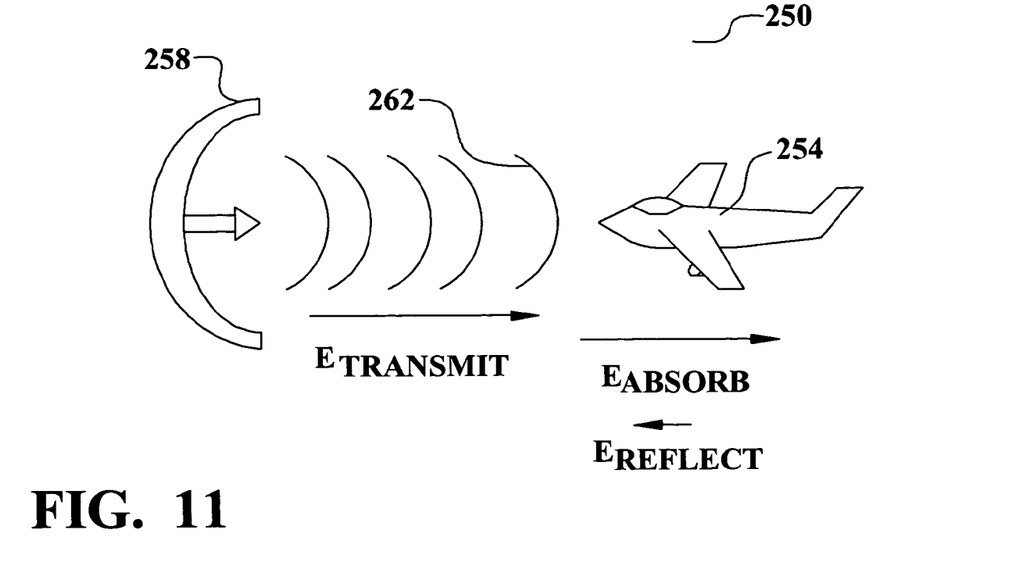
FIG. 11 illustrates a sixth preferred embodiment of the present invention showing an aircraft having an aircraft skin and/or structures comprising the conductive loaded resin-based material of the present invention to thereby reduce electromagnetic energy reflection.

Referring now to FIG. 11, a sixth preferred embodiment 250 of the present invention is illustrated. In this case, the skin and/or structural materials of the aircraft 254 comprise the conductive loaded resin-based material according to the present invention. An important property of this material is that it absorbs RF energy to a greater extent than typical structural and/or skin materials. Radar detection systems 258 emit RF energy 262 and then measure the RF energy returning from any objects, such as aircraft, in the radar 258 field of view. A typical prior art aircraft, comprising an aluminum skin, will reflect a large amount of the incident RF energy 262 from the radar 258. As a result, it is relatively easy for a modern radar detection system 258 to detect such prior art aircraft. In the art of radar detection, this effect is called a large radar footprint. By comparison, an aircraft 254 with a skin and/or structural components comprising the conductive loaded resin-based material of the present invention will possess a conductive resin lattice structure that maximizes absorption of incident RF energy 262 from the radar 258. As a result, it is relatively difficult for the radar detection system 258 to detect the aircraft 254. Therefore, a relatively small radar footprint can be achieved using the material of the present invention.

Figure 2:
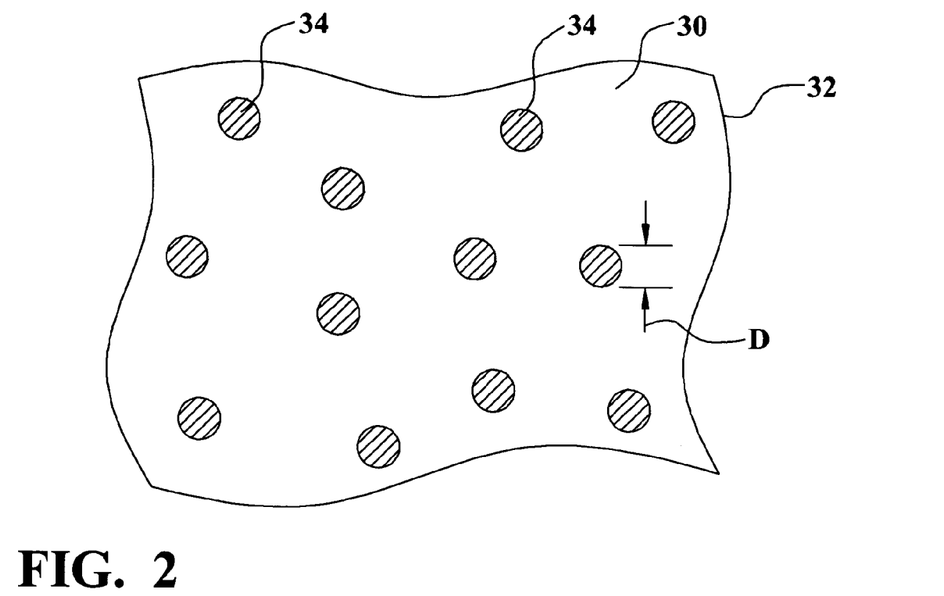
FIG. 2 illustrates a first preferred embodiment of a conductive loaded resin-based material wherein the conductive materials comprise a powder.

The conductive loaded resin-based material of the present invention typically comprises a micron powder(s) of conductor particles and/or in combination of micron fiber(s) substantially homogenized within a base resin host. FIG. 2 shows cross section view of an example of conductor loaded resin-based material 32 having powder of conductor particles 34 in a base resin host 30. In this example the diameter D of the conductor particles 34 in the powder is between about 3 and 12 microns.

Figure 3:
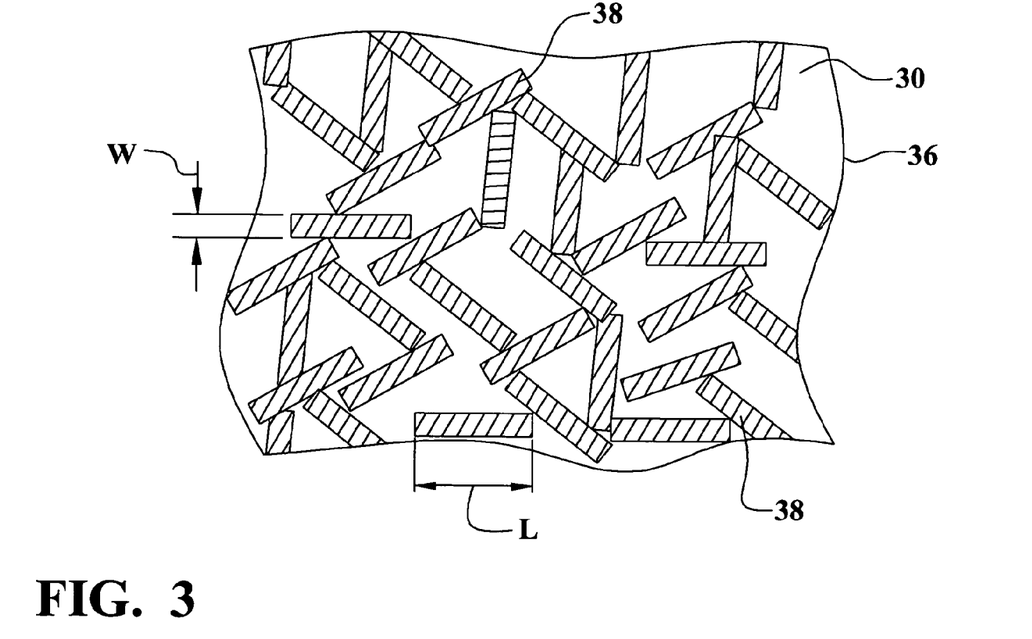
FIG. 3 illustrates a second preferred embodiment of a conductive loaded resin-based material wherein the conductive materials comprise micron conductive fibers.
Figure 4:
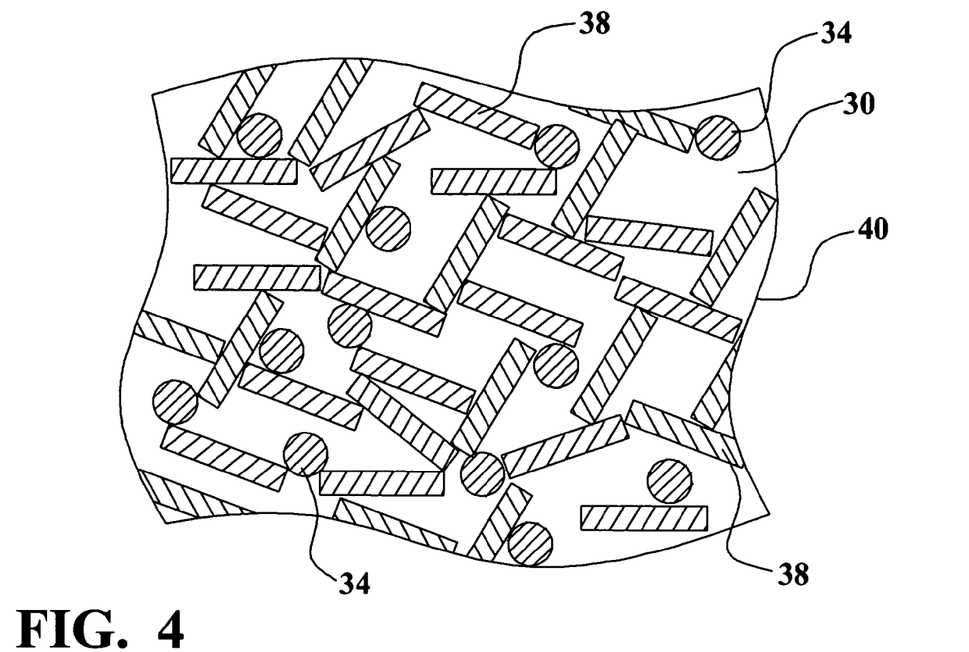
FIG. 4 illustrates a third preferred embodiment of a conductive loaded resin-based material wherein the conductive materials comprise both conductive powder and micron conductive fibers.

FIG. 3 shows a cross section view of an example of conductor loaded resin-based material 36 having conductor fibers 38 in a base resin host 30. The conductor fibers 38 have a diameter of between about 3 and 12 microns, typically in the range of 10 microns or between about 8 and 12 microns, and a length of between about 2 and 14 millimeters. The conductors used for these conductor particles 34 or conductor fibers 38 can be stainless steel, nickel, copper, silver, aluminum, or other suitable metals or conductive fibers, or combinations thereof. Superconductor metals, such as titanium, nickel, niobium, and zirconium, and alloys of titanium, nickel, niobium, and zirconium may also be used as micron conductive fibers in the present invention. These conductor particles and or fibers are substantially homogenized within a base resin. As previously mentioned, the conductive loaded resin-based materials have a sheet resistance between about 5 and 25 ohms per square, though other values can be achieved by varying the doping parameters and/or resin selection. To realize this sheet resistance the weight of the conductor material comprises between about 20% and about 50% of the total weight of the conductive loaded resin-based material. More preferably, the weight of the conductive material comprises between about 20% and about 40% of the total weight of the conductive loaded resin-based material. More preferably yet, the weight of the conductive material comprises between about 25% and about 35% of the total weight of the conductive loaded resin-based material. Still more preferably yet, the weight of the conductive material comprises about 30% of the total weight of the conductive loaded resin-based material. Stainless Steel Fiber of 6-12 micron in diameter and lengths of 4-6 mm and comprising, by weight, about 30% of the total weight of the conductive loaded resin-based material will produce a very highly conductive parameter, efficient within any EMF spectrum. Referring now to FIG. 4, another preferred embodiment of the present invention is illustrated where the conductive materials comprise a combination of both conductive powders 34 and micron conductive fibers 38 substantially homogenized together within the resin base 30 during a molding process.

Figure 5A:
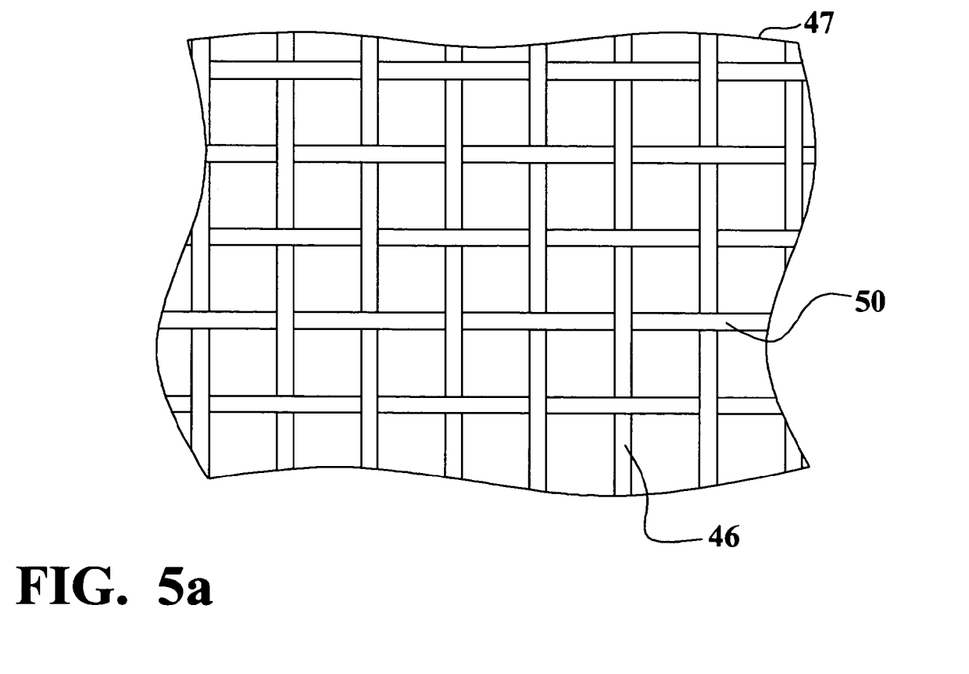
FIGS. 5a and 5b illustrate a fourth preferred embodiment wherein conductive fabric-like materials are formed from the conductive loaded resin-based material.
Figure 5B:
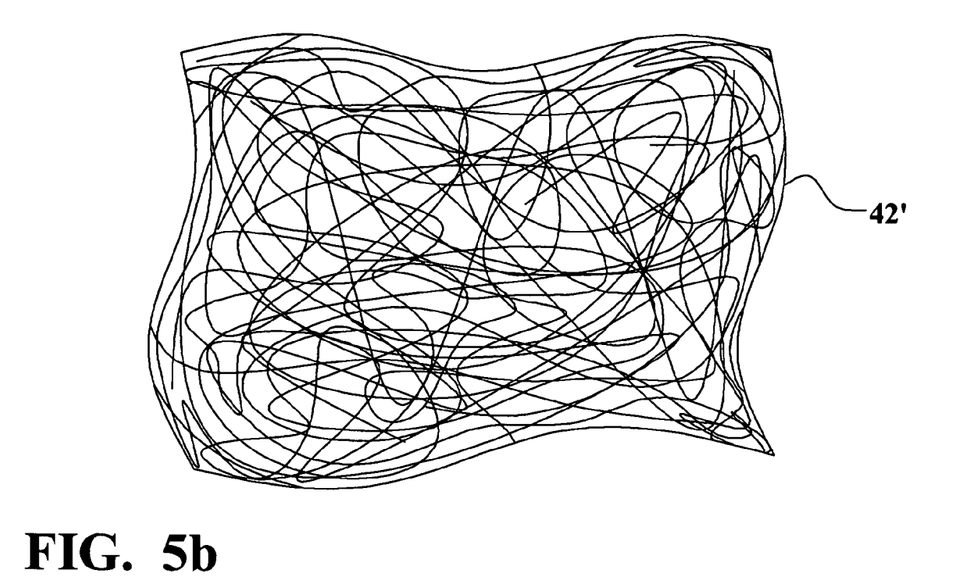

Referring now to FIGS. 5a and 5b, a preferred composition of the conductive loaded, resin-based material is illustrated. The conductive loaded resin-based material can be formed into fibers or textiles that are then woven or webbed into a conductive fabric. The conductive loaded resin-based material is formed in strands that can be woven as shown. FIG. 5a shows a conductive fabric 42 where the fibers are woven together in a two-dimensional weave 46 and 50 of fibers or textiles. FIG. 5b shows a conductive fabric 42' where the fibers are formed in a webbed arrangement. In the webbed arrangement, one or more continuous strands of the conductive fiber are nested in a random fashion. The resulting conductive fabrics or textiles 42, see FIG. 5a, and 42', see FIG. 5b, can be made very thin, thick, rigid, flexible or in solid form(s).

Similarly, a conductive, but cloth-like, material can be formed using woven or webbed micron stainless steel fibers, or other micron conductive fibers. These woven or webbed conductive cloths could also be sandwich laminated to one or more layers of materials such as Polyester(s), Teflon(s), Kevlar(s) or any other desired resin-based material(s). This conductive fabric may then be cut into desired shapes and sizes.

Figure 6A:
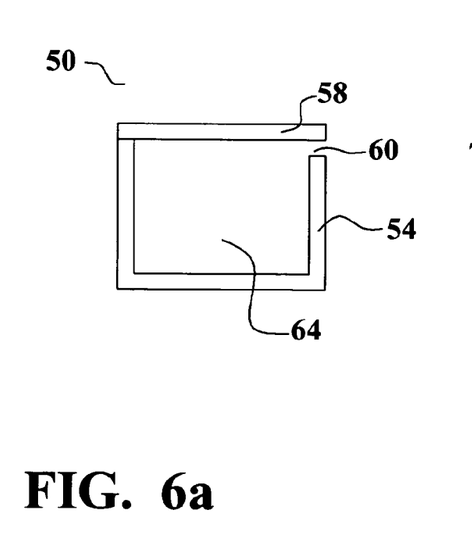
FIGS. 6a and 6b illustrate, in simplified schematic form, an injection molding apparatus and an extrusion molding apparatus that may be used to mold aircraft structures and avionics of a conductive loaded resin-based material.

Aircraft structures and avionics formed from conductive loaded resin-based materials can be formed or molded in a number of different ways including injection molding, extrusion or chemically induced molding or forming. FIG. 6a shows a simplified schematic diagram of an injection mold showing a lower portion 54 and upper portion 58 of the mold 50. Conductive loaded blended resin-based material is injected into the mold cavity 64 through an injection opening 60 and then the substantially homogenized conductive material cures by thermal reaction. The upper portion 58 and lower portion 54 of the mold are then separated or parted and the structures or devices are removed.

Figure 6B:
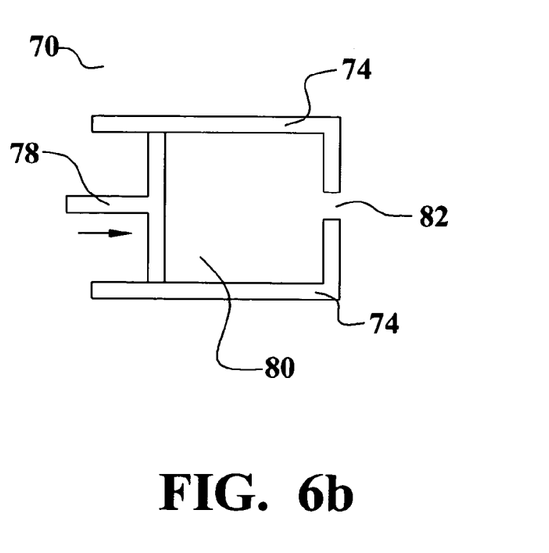

FIG. 6b shows a simplified schematic diagram of an extruder 70 for forming aircraft structures and avionics devices using extrusion. Conductive loaded resin-based material(s) is placed in the hopper 80 of the extrusion unit 74. A piston, screw, press or other means 78 is then used to force the thermally molten or a chemically induced curing conductive loaded resin-based material through an extrusion opening 82 which shapes the thermally molten curing or chemically induced cured conductive loaded resin-based material to the desired shape. The conductive loaded resin-based material is then fully cured by chemical reaction or thermal reaction to a hardened or pliable state and is ready for use. Thermoplastic or thermosetting resin-based materials and associated processes may be used in molding the conductive loaded resin-based articles of the present invention.

The advantages of the present invention may now be summarized. An effective aircraft device is achieved. A method to form an aircraft device of the conductive loaded resin-based material is also achieved. Avionics components having reduced weight and improved performance are achieved. Aircraft components having reduced weight and improved electromagnetic and conductive performance are achieved. The electrical, thermal, and electromagnetic characteristics can be altered or the visual characteristics can be altered by forming a metal layer over the conductive loaded resin-based material. A method to fabricate an aircraft component from a conductive loaded resin-based material where the material is in the form of a fabric is achieved.

As shown in the preferred embodiments, the novel methods and devices of the present invention provide an effective and manufacturable alternative to the prior art.

While the invention has been particularly shown and described with reference to the preferred embodiments thereof, it will be understood by those skilled in the art that various changes in form and details may be made without departing from the spirit and scope of the invention.

What is claimed is:

1. An avionics device comprising a conductive wire of conductive loaded, resin-based material comprising micron conductive fiber and conductive powder in a base resin host wherein said conductive powder is a non-conductive material with a metal plating of nickel, copper, silver, or alloys thereof, and wherein the percent by weight of said micron conductive fiber is between 20% and 50% of the total weight of said conductive loaded resin-based material.

2. The device according to claim 1 wherein said micron conductive fiber are nickel plated carbon micron fiber, stainless steel micron fiber, copper micron fiber, silver micron fiber and combinations thereof.

3. The device according to claim 1 wherein said conductive powder is nickel, copper, or silver.

* * * * *